Sept. 28, 1954     R. I. ROTH     2,690,549
FOLLOW-UP DEVICE
Filed Dec. 13, 1951     6 Sheets-Sheet 1
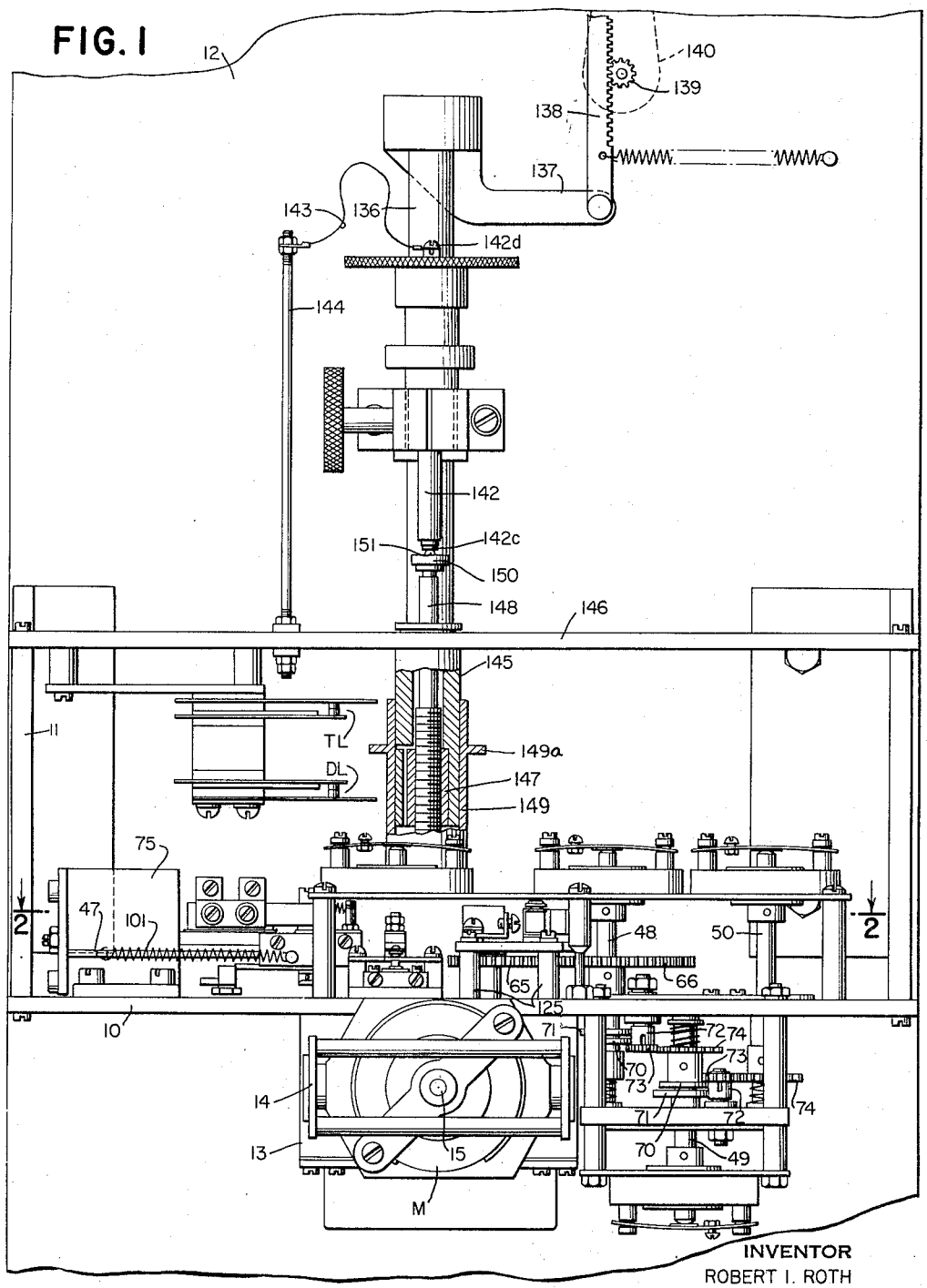
INVENTOR
ROBERT I. ROTH
BY
*William Lang*
ATTORNEY Sept. 28, 1954 R. I. ROTH 2,690,549
FOLLOW-UP DEVICE
Filed Dec. 13, 1951 6 Sheets-Sheet 2
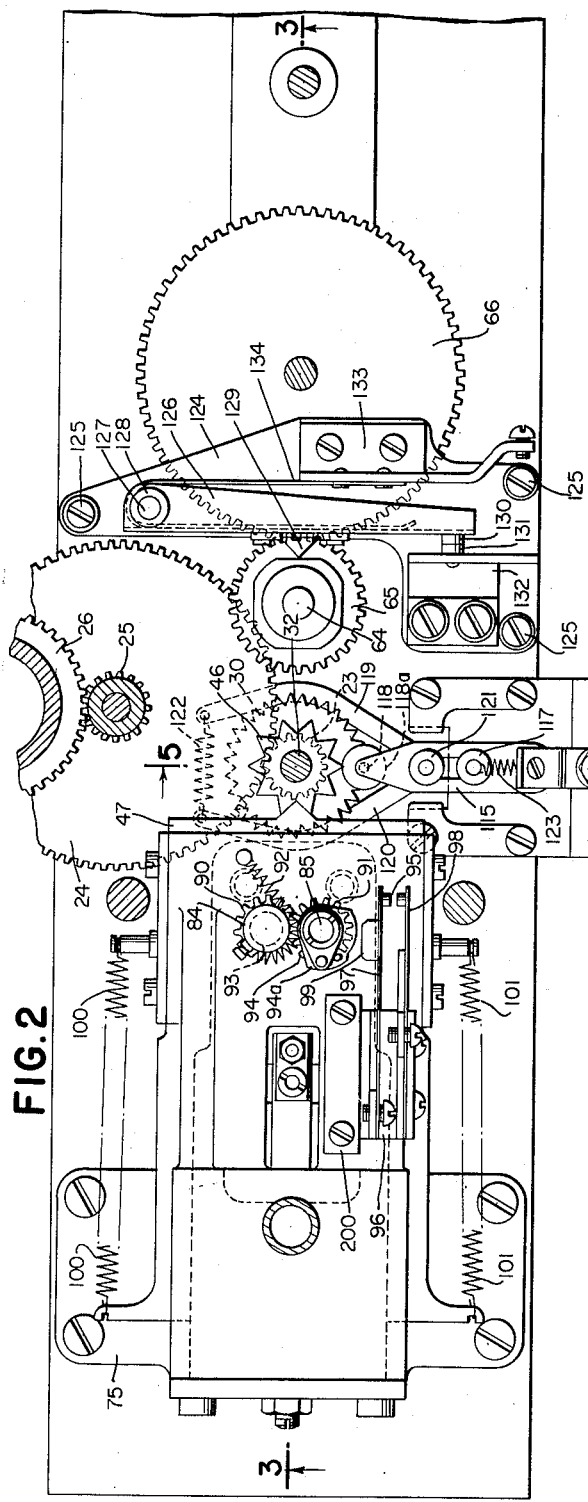
INVENTOR
ROBERT I. ROTH
BY
William Lang
ATTORNEY

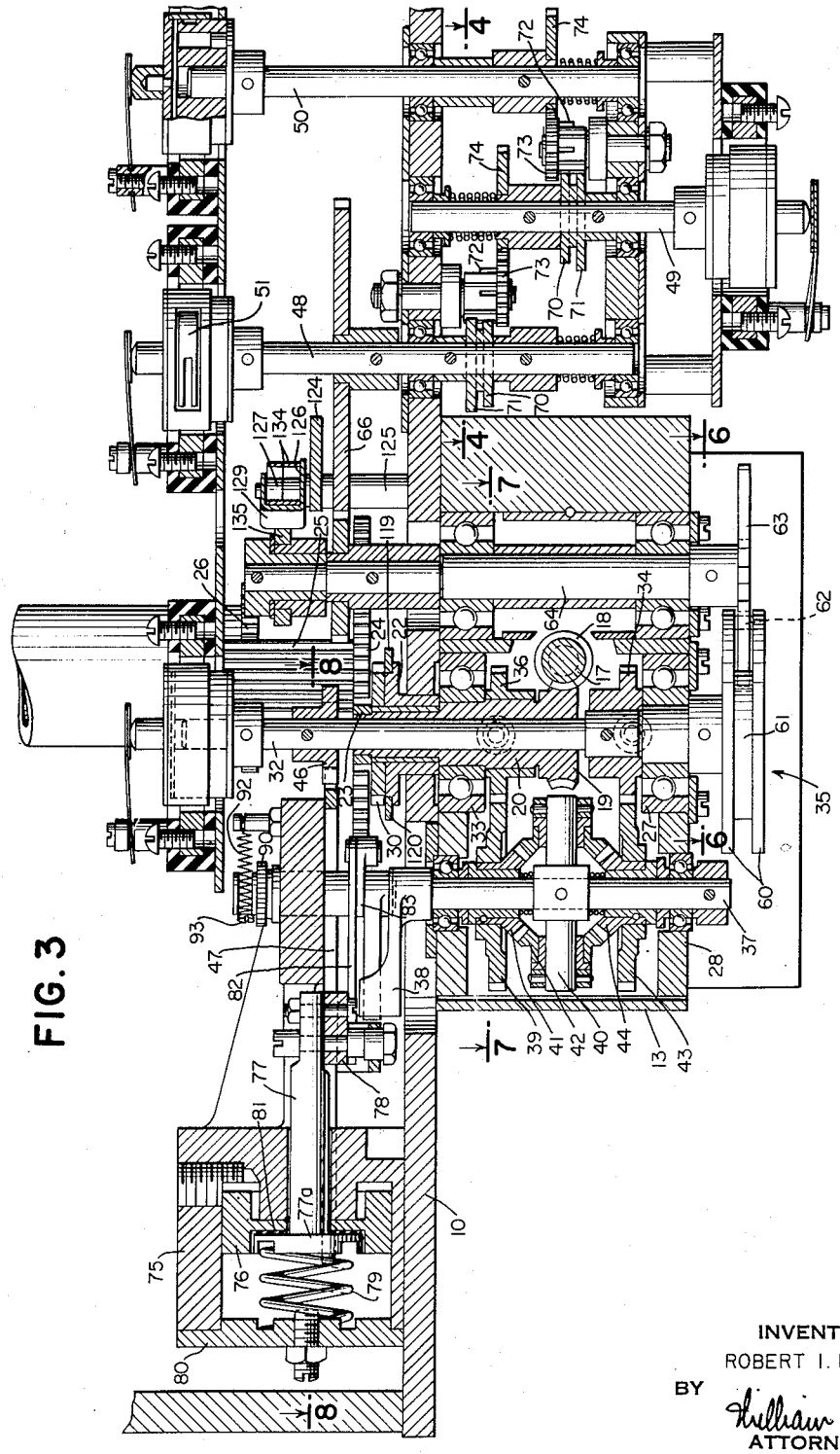

Sept. 28, 1954  R. I. ROTH  2,690,549
FOLLOW-UP DEVICE
Filed Dec. 13, 1951  6 Sheets-Sheet 4

INVENTOR
ROBERT I. ROTH
BY William Lang
ATTORNEY

Patented Sept. 28, 1954

2,690,549

UNITED STATES PATENT OFFICE 2,690,549

FOLLOW-UP DEVICE

Robert I. Roth, Mount Pleasant, N. Y., assignor to International Business Machines Corporation, New York, N. Y., a corporation of New York Application December 13, 1951, Serial No. 261,563

3 Claims. (Cl. 340—187)

This invention relates to measuring apparatus with indirectly operated means to take readings of the measurements.

Such measuring apparatus may be a weighing scale, a testing machine, a pressure gage, a unit of a self-synchronous motor system, a dynamometer, and so on. Any such measuring apparatus includes a device deflectable according to a variable. Such variable may be weight, pressure, voltage, current, displacement of an object, etc.

The principal object of the invention is to provide an improved means for taking readings of a device linearly movable according to a variable.

An object of the invention is to provide a continuous indication of the position of the sensing means.

An object of the invention is to provide positively operable mechanisms for taking readings of the deflection of the device operable according to a variable.

Another object of the invention is to substantially reduce the number of elements required for taking readings of the deflection of the device operable according to a variable.

An object of the invention is to provide novel means for hunting the variably displaceable device. By "hunting" is meant the continual reciprocation of a sensing means to and from the position of the displaceable device.

An object of the invention is to provide improved means for continually taking readings dependent on the deflection of a variable-responsive device.

Still another object of the invention is to provide a novel registering means for taking readings of the deflection of the device operable according to a variable.

Yet another object of the invention is to provide a novel locking means for a registering means for taking readings of the deflection of the device operable according to a variable.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a front view of a gage unit with a linear motion follower.

Fig. 2 is a section taken along line 2—2 of Fig. 1.

Fig. 3 is a section taken along line 3—3 of Fig. 2.

Fig. 4 is a detailed sectional view taken along line 4—4 of Fig. 3.

Fig. 5 is a detailed sectional view taken along line 5—5 of Fig. 2.

Figure 10A:
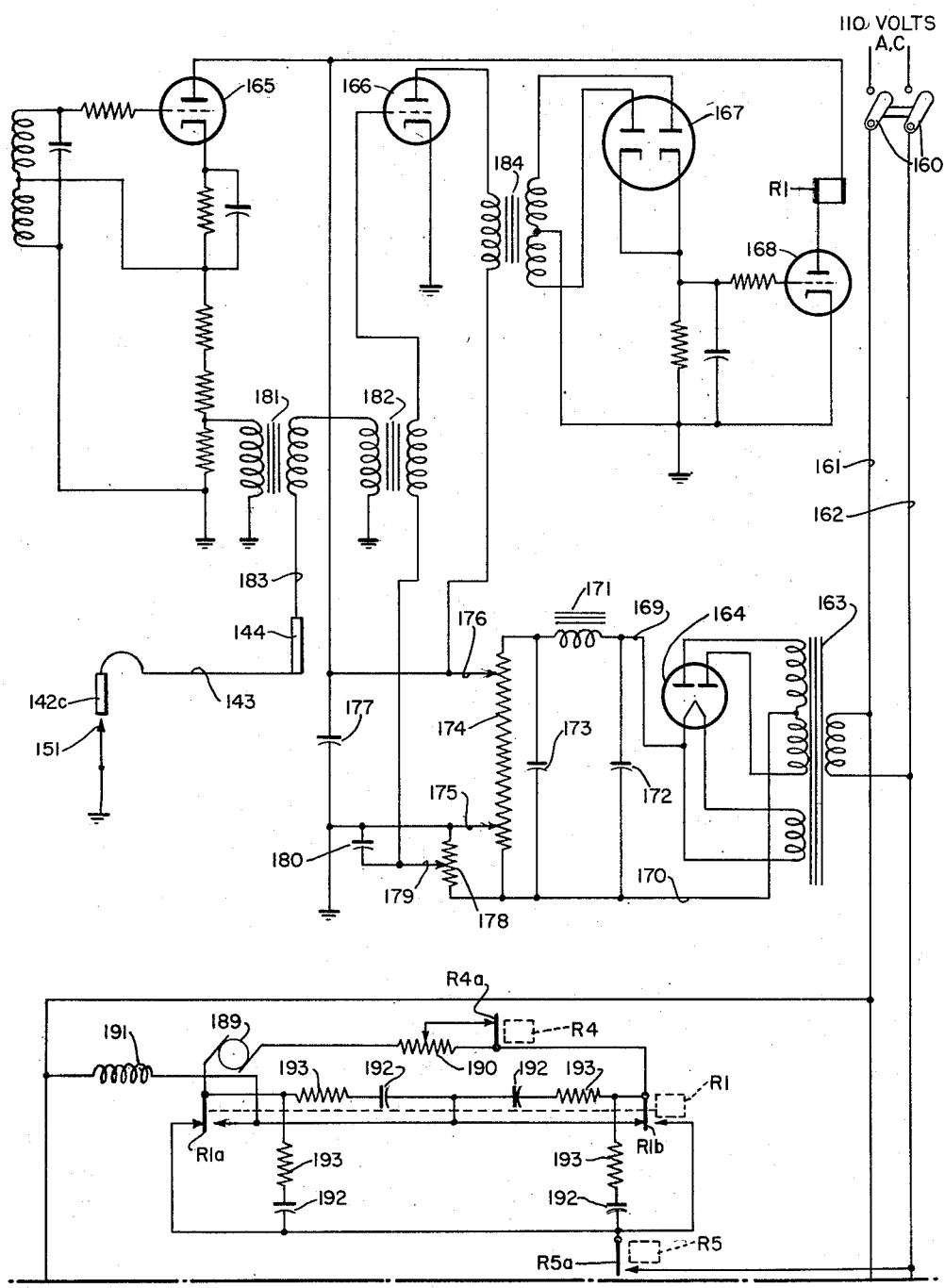
Figure 10B:
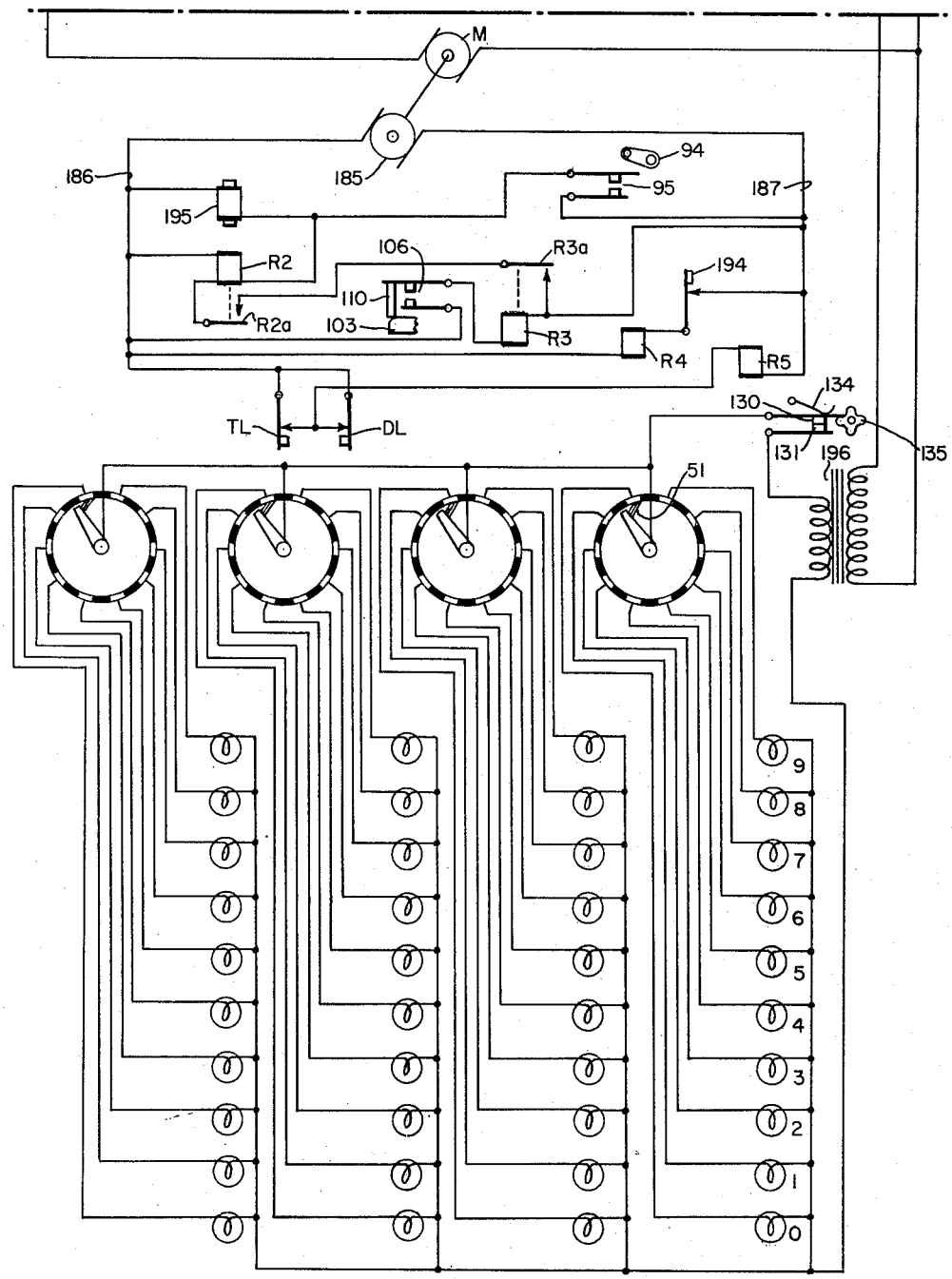

Figs. 10a and 10b, taken together, form a circuit diagram of the operating circuits for the follow-up device.

General description

This apparatus includes means to sense the displacement of an element movable according to a variable. Such element is a suitable part of a measuring instrument or gage, examples of which are weighing scales, testing machines, pressure gages and dynamometers. Each gage includes an element linearly movable in accordance with a variable. An electrical sensing means is used to sense the linearly movable element. The means to sense displacement of the linearly movable element may be called a linear motion sensing or follow-up device.

The apparatus further includes register means controlled by the sensing means for registering the value of the displacement and means controlled by the register means to indicate the value. The register means is constructed as an attachment which may be mounted to a gage for coaction with the sensing device. The indicating means includes a lamp bank which is electrically controlled by the register and may be mounted in any convenient place, as remote from the measuring instrument as desired.

The attachment which includes the register means also mounts an electric motor with drive means for the register elements. In addition, the motor drives the follow-up or sensing device. The register and the sensing means are driven in predetermined relation in such manner that the register counts chosen increments of movement of the sensing means.

Both positive and negative displacements of the variable-responsive element of the gage may take place. The positive displacement of the element is its displacement in one direction from a zero position; the negative displacement is in the opposite direction from the positive displacement toward zero. Correspondingly, the register means will be moved in one direction to receive a positive change in value and in opposite direction to receive a negative change in value. Positive and negative directions of movement of the various parts may be identified in the drawings by arrows P and N, respectively.

The follow-up means will continually seek the position of the variable-responsive element. Each time it finds the position of the element, its movement will be reversed. When it loses contact with the element, the follow-up means will again be reversed. In this manner, the follow-up means will continually reciprocate about the position of the variable-responsive element. Such action of the follower means is called "hunting." Each time the follow-up means finds the position of the element it initiates reversal of the motor, in the register attachment, which drives both the follow-up means and the register means.

The register means includes a continuous gear train which transmits motion to the units order shaft which in turn drives the higher orders of the register. Means is provided to lock the units order shaft against movement by the gear train as long as the variable-responsive element remains in one position. When the element moves to a new position means are brought into operation for releasing the units order shaft and permit the register means to register an amount dependent on the position of the element. The lamp bank which visually indicates the registered amount is directly controlled by the register means. Hence, the lamp bank will continuously indicate the quantity represented by the position of the follow-up means. It is thus seen that the operation of the register means will be interrupted while the variable-responsive gage element remains stationary.

The register attachment

Referring to Fig. 1, the register attachment comprises a base plate 10. The base plate will be suitably attached to the frame of the gage. As shown in Fig. 1, the base plate is attached to brackets 11 which are bolted to the frame plate 12 of the gage.

Secured to the bottom of the base plate 10 is a block 13 to which are bolted the brackets 14 for mounting the drive motor M. The shaft 15 of motor M is connected by a coupling to a shaft 17 (Fig. 3) on which is a worm 18 for driving a worm wheel 19 on a sleeve shaft 20. Shaft 17 is mounted in the same manner and functions in the same way as shaft 17 shown in Fig. 2 of U. S. Patent No. 2,506,470 issued May 2, 1950, to R. I. Roth, et al.

Fixed to the upper end of sleeve shaft 20 is a grooved wheel 22 to the top of which is fixed a notched wheel 30 and a pinion 23. Pinion 23 meshes with a gear 24 (see Figs. 2 and 3). Rigid with the gear 24 is a pinion 25. When the register attachment is mounted to the gage, the pinion 25 meshes with a gear of the follow-up means. As shown in Fig. 3, pinion 25 is meshed with a gear 26 of a linear motion follow-up means. Gear 26 is vertically movable and pinion 25 is long enough to allow the gear 26 to remain meshed throughout its entire range of vertical travel.

Figure 7:
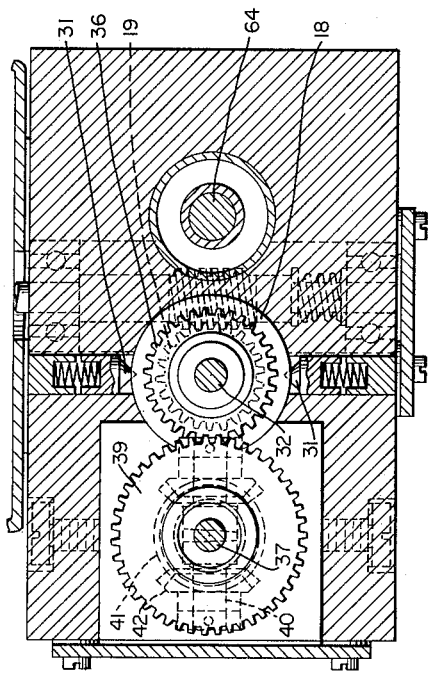
Fig. 7 is a detailed sectional view taken along line 7—7 of Fig. 3.
Figure 9:
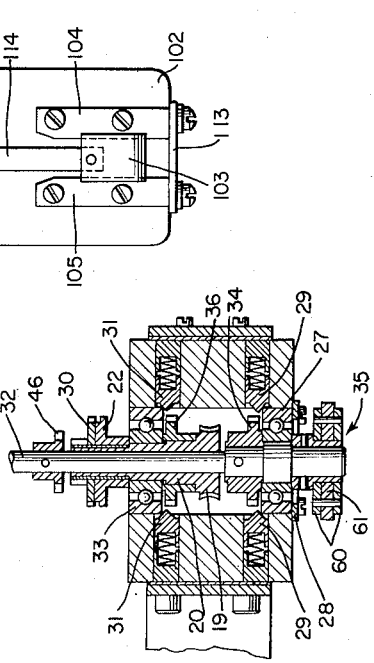
Fig. 9 is a detailed sectional view taken along line 9—9 of Fig. 8.

Referring to Figs. 3, 7 and 9, a shaft 32 passes through the motor-driven sleeve shaft 20. The sleeve shaft 20 is mounted in a bearing 33 and moves freely about shaft 32 which is the units shaft. The outer race of bearing 33 is held between the bottom of base plate 10 and conical portions of a pair of spring pressed plungers 31. Shaft 32 is journalled near its lower end in a bearing 27, the outer edge of which is held between a plate 28 fastened to the bottom of block 13 and conical portions of a pair of spring pressed plungers 29. The conical points of plungers 29 exert a force upon the outer edge of bearing 27 which forces it down in the bore of block 13 against plate 28. Pinned to shaft 32 above bearing 27 is a gear 34 (Figs. 3 and 9) and also pinned to shaft 32 below bearing 27 is a member 35 which is the driving member of a Geneva gearing arrangement. Rigidly fastened to the sleeve shaft 20 below bearing 33 is a gear 36 which has the same number of teeth as gear 34.

In Fig. 3, it is seen that a shaft 37 is mounted for rotation in block 13. The upper end of shaft 37 extends through base plate 10 and carries an arm 38 fastened thereto. Gear 36 meshes with a gear 39 rotatably mounted on shaft 37. A cross shaft 40 is fixed to shaft 37 and carries loosely mounted thereon a bevel gear 42. Secured to gear 39 is a bevel gear 41 which engages bevel gear 42. A gear 43 is freely mounted on the lower portion of shaft 37. Fastened to gear 43 is a bevel gear 44 which also meshes with bevel gear 42. Gear 43 in turn engages gear 34 which is pinned to units shaft 32.

Figure 8:
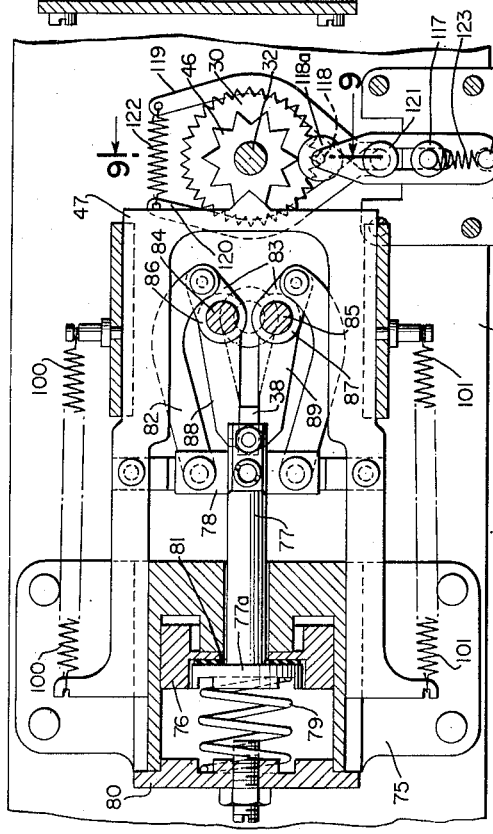
Fig. 8 is a detailed sectional view taken along line 8—8 of Fig. 3.

When arm 38 is rigidly held in the position shown in Fig. 8, as described hereinafter, the drive from motor M to units shaft 32 is traced in Fig. 3 as follows: shaft 17, worm 18, worm wheel 19, gear 36, gear 39, bevel gears 41, 42 and 44 and the latter gear meshing with gear 34 which is pinned to the units shaft. Rotation of units shaft 32 causes the Geneva gearing arrangement to effect rotation of an intermediate shaft 64 as explained hereinafter.

Fastened to units shaft 32 is a star wheel 46 (Fig. 2) which can be engaged by a detent plate 47. When detent plate 47 engages star wheel 46, arm 38 is free to move within limits in a horizontal plane as explained later in this description.

The detenting of wheel 46 locks shaft 32 against rotation and the drive from motor M is traced in Fig. 3 as follows: shaft 17, worm 18, worm wheel 19, gear 36, gear 39, bevel gear 41 and bevel gear 42 which rotates and causes movement of cross shaft 40. Since cross shaft 40 is fixed to shaft 37, shaft 37 is also rotated. It should be noted that since shaft 32 is locked against rotation, gear 34 which is pinned to shaft 32 causes gears 43 and 44 to be locked against rotation and the motion transmitted to gear 42 through gear 41 causes gear 42 to ride over the surface of locked gear 44.

The register has four orders, the units, tens, hundreds and thousand orders. The units order shaft 32 is driven through the differential gearing mechanism described hereinbefore. When the capacity of the units order is exceeded, the shaft 32, by means of the Geneva gearing arrangement, effects a step of movement of a tens order shaft 48. Similarly, the tens order shaft 48, steps along a hundreds order shaft 49, and the hundreds order shaft, through a similar transfer, through an intermittent gearing transfer, steps along a thousands order shaft 50 (Figs. 1 and 3). It is seen then that the register functions as a counter. The value positions of the orders are electrically registered by readout commutators, each being of the type disclosed in Patent No. 2,447,819 issued August 24, 1948, to Robert I. Roth.

Each readout commutator (Fig. 3) includes a carrier for a brush 51 which is adapted to wipe the segments 0 to 9. The carrier in turn is mounted on a denominational order shaft. It will be seen that each of the denominational order shafts 32, 48, 49 and 50 of the register structure has ten rotative positions in which the connected brush 51 engages the contact segments 0 to 9. One step of value movement of the denominational order shaft is the movement required to move the brush from one contact segment to an adjacent segment.

Figure 6:
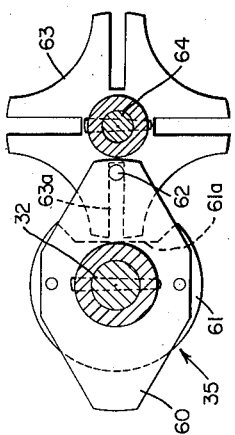
Fig. 6 is a detailed sectional view taken along line 6—6 of Fig. 3.

When the units order exceeds its capacity, it transfers one to the tens order. For this purpose, the units order shaft 32 carries a Geneva driver 35 (Figs. 3 and 6) comprising a pair of plates 60 between which is sandwiched a locking plate 61, all three plates being rigidly secured to each other to form a rigid assembly which is fastened to the lower end of the shaft 32. The plates 60 are bridged by a driving pin 62 which is centrally located with respect to a recess 61a in the locking plate 61. The Geneva driver coacts with a Maltese cross-shaped wheel 63 fixed to an intermediate shaft 64. Wheel 63 has four radial slots 63a, and concave arcuate peripheral portions between the slots to accommodate the circular portion of locking plate 61. As long as the circular portion of plate 61 rides in a concave peripheral portion of wheel 63, the wheel is locked against rotation. When the recess 61a begins to pass the wheel 63, the wheel is free to be moved and the pin 62 enters a slot 63a in the wheel as shown in Fig. 6. The pin 62 cams against a wall of the slot to move the wheel slowly at the start, then more rapidly, and then again slowly as the pin leaves the slot. The net effect is that when the shaft 32 moves from the 9 to 0 value position in the positive direction or from the 0 to 9 value position in the negative direction, the wheel 63 and its shaft 64 are rotated through a quarter of a revolution.

Shaft 64 carries a gear 65 (Figs. 2 and 3) meshed with a gear 66 on the tens order shaft 48. The gear ratio is such that when shaft 64 makes one quarter of a revolution, the shaft 48 makes one tenth of a revolution. Thus, each time the units order shaft 32 passes through its carry position, it acts through the described gearing, to effect a carry step of the tens order shaft 48.

It will be noted that the carry means just described provides for a smooth gradual carry, which is especially desirable because the units order shaft 32 is rotated at high speed.

A known intermittent gearing transfer is provided between the tens and hundreds orders and between the hundreds and thousands orders. Referring to Figs. 3 and 4, the transfer device between the tens order and hundreds order includes a driver disk 70 and locking plate 71 fixed to tens order shaft 48. The disk 70 has two driving teeth, and the locking plate 71 has a notch aligned with the space between the two teeth on disk 70. The driven element of the transfer includes an eight-toothed pinion 72 for coacting with the teeth of disk 70. Alternate teeth are cut short, leaving four widely spaced teeth opposite the locking plate 71. When the tens order shaft 48 is in positions 0 to 9, the circular periphery of the locking plate 71 is in the space between two of the long teeth of pinion 72, locking the pinion against rotation. When the tens order shaft moves in the positive direction, indicated by the arrow P, from 9 to 0 value position or when the shaft moves in the negative direction, indicated by the arrow N, from 0 to 9 value position, then the notch in the locking plate 71 meshes with a tooth of pinion 72 while the teeth of driver disk 70 coact with the teeth of pinion 72 to effect a quarter of a revolution of the pinion. Rigid with the pinion 72 is a pinion 73 meshing with a gear 74 on the hundreds order shaft 49. The ratio of pinion 73 to gear 74 is such that in one quarter of a revolution of the pinion 73, it drives the gear 74 and the hundreds order shaft 49 through one-tenth of a revolution. In this way, a carry is effected to the hundreds order upon the tens order going from 9 to 0 in the positive direction or from 0 to 9 in the negative direction. It is evident that the higher of two orders in receiving a carry from the lower one of the orders will move in the same direction as the lower order.

A similar transfer is provided between the hundreds order shaft 49 and the thousands order shaft 50.

*Air piston and detent mechanism*

The air piston and detent mechanism is used to hold arm 38 in the position shown in Fig. 8 and also lock the shaft 32 against rotation to allow arm 38 to oscillate during the hunting operation as explained hereinafter. Referring to Figs. 3 and 8, it is seen that this mechanism is mounted on a casting 75 which is fastened to the top of the counter plate 10. Casting 75 is bored out at the left end, as viewed in Fig. 8, to receive a piston 76 which is free to slide within the bore of said casting. Piston 76 is free to move on a piston rod 77 which has an integral head portion 77a and extends through an opening provided in casting 75 at its right end. Piston rod 77 carries a cross bar 78 on the end protruding from casting 75.

Piston 76 is forced to the right as viewed in Fig. 3 by a coil spring 79 which bears against a removable plate 80 fastened to the left end of casting 75. A gasket 81 is positioned between the head portion 77a of piston rod 77 and piston 76 to prevent loss of air at this point. If air is admitted to the bore of the casting 75 from the right, piston 76 is forced to the left as viewed in Fig. 8, against the action of spring 79, thereby moving cross bar 78 also to the left. Two link arms 82 are pivotally mounted at their left ends to cross bar 78 and at their right ends to a pair of levers 83. Levers 83 are loosely mounted on shafts 84 and 85 which are journaled in sleeves 86 and 87 respectively pressed into casting 75. Pinned to shaft 84 is an arm 88 and pinned to shaft 85 is an arm 89. Lug portions on levers 83 engage arms 88 and 89 so that when piston 76 moves to the left, arm 88 is rotated in a counterclockwise direction and arm 89 is rotated clockwise. It is seen in Figs. 3 and 8 that arm 38 extends up between arms 88 and 89 and is engaged by them and positioned in the position shown in Fig. 8 when piston 76 moves to the left. Also secured to cross bar 78 is the detent plate 47 which is mounted for reciprocation in casting 75. Springs 100 and 101 are fastened at the left end of detent plate 47 to continually urge the plate into engagement with star wheel 46. Thus, when air is admitted to the bore of casting 75, piston 76 causes movement of linkage 78, 82, 83, 88 and 89 in order to lock arm 38, thereby locking shaft 37 against rotation. At the same time detent plate 47 is retracted from star wheel 46 to allow rotation of units shaft 32. When air is extracted from the bore of casting 75, piston 76 moves to the right, thereby unlocking arm 38 and shaft 37. At the same time detent plate 47 is moved into engagement with star wheel 46. Units shaft 32 will then be locked against rotation and shaft 37 will be free to oscillate.

Referring again to Fig. 2, it is seen that shafts 84 and 85 are geared together at their upper ends by means of gears 90 and 91 respectively which are fixed to said shafts. A spring 92 is secured to casting 75 and stretched around a grooved pulley 93 where it is anchored to a pin extending from the grooved surface. Pulley 93 is rigidly fastened to the top of shaft 84. Spring 92 thus urges shaft 84 in a counterclockwise direction, as viewed in Fig. 2, and shaft 85 in a clockwise direction through intermeshing gears 90 and 91. The movement of shafts 84 and 85 is limited by the position of arm 38. When arm 38 oscillates, it will move either arm 88 or arm 89 since these arms are urged toward arm 38 by spring 92. Fastened to the top of shaft 85 above gear 91 is a cam 94. A switch 95 is mounted on an insulating block 96 secured to casting 75 through a supporting block 200. Switch 95 comprises two spring blades 97 and 98, each of which carries a contact and extends from block 96. Spring blade 97 has fixed thereto an insulated stud 99 which is adapted to be engaged by cam 94. If cam 94 is rotated sufficiently in a counterclockwise direction, as viewed in Fig. 2, a rise 94a on cam 94 engages stud 99 causing spring blade 97 to be moved sufficiently to close switch 95. The closure of switch 95 energizes a solenoid on a solenoid air valve, as will be explained hereinafter in connection with the description of the operating circuits, to admit air to the bore of casting 75 and force piston 76 to the left as viewed in Fig. 8. This action which was previously explained causes arm 38 to be returned to the position shown in Fig. 8 and units shaft 32 to be released for rotation. Whenever arm 38 oscillates far enough clockwise or counterclockwise to effect a closure of switch 95, it will be immediately returned to the position of Fig. 8 by means of compressed air acting on piston 76. Switch 95 thus limits the oscillation of arm 38.

Friction contact assembly

In order to control the detenting of star wheel 46 and thereby lock units shaft 32 from rotation, a contact assembly is provided which opens every time motor M reverses. Referring to Figs. 2 and 5, the contact assembly is mounted on a plate 102 which in turn is fastened to the top of base plate 10. A block 103 is mounted for reciprocation between guide members 104 and 105 secured to the top of plate 102. A switch 106 is mounted on a block 107 secured to plate 102. Switch 106 comprises two spring blades 108 and 109, each of which carries a contact and extends from block 107. Spring blade 108 has fixed thereto an insulated stud 110 which extends through an opening in blade 109 and is adapted to be engaged by block 103. When block 103 is at the right hand limit of its movement, as shown in Fig. 5, switch 106 is open and when the block 103 is moved to the left, switch 106 is closed. A compression spring 112 is positioned between block 103 and a bar 113 which is secured to the right ends of guides 104 and 105. Spring 112 constantly urges block 103 to move to the left.

Referring again to Fig. 5, it is seen that a link 114 is pivotally mounted at its right end to block 103. A slotted link 115 is pivotally mounted at the right end on a stud 116 carried by the left end of link 114. A pivot stud 117 extends upward from plate 102 and is adapted to receive the slotted portion of link 115, thereby permitting reciprocation of link 115. A coil spring 123 is stretched between studs 116 and 117 to urge links 114 and 115 to the left as viewed in Fig. 5. The left end of link 115 carries a downwardly extending stud 118 having a flange portion 118a.

A pair of arms designated 119 and 120 (Figs. 2 and 5) are pivoted together by a stud 121 which extends upward through the slot in link 115. The intermediate portions of arms 119 and 120 extend into the groove located between grooved wheel 22 and notched wheel 30 (Fig. 3). A spring 122 extends between the free ends of arms 119 and 120 to hold them in the groove. The frictional force between arms 119 and 120 and the surface of the groove in which they ride is sufficient to cause rocking of the slotted link 115 about pivot stud 117 when sleeve shaft 20 is moved either in a positive or negative driection.

In Fig. 2, arms 119 and 120 are shown in a neutral position in which links 114 and 115 are maintained in their extreme right position, as viewed in Fig. 5, and switch 106 is held open. When stud 118 is engaged by notched wheel 30, the notched wheel positively moves stud 118 with it for a portion of its rotation. During this rotation, when stud 118 is engaged with notched wheel 30, the slotted link 115 and connected link 124 are forced to the left, as viewed in Fig. 5, under pressure of springs 112 and 123. This action causes block 103 to be moved to the left, thus closing switch 106. Each time the motor M reverses, this action will take place whereby stud 118 is alternately engaged by notched wheel 30 and switch 106 is opened and closed.

High speed indication circuit breaker

In order to prevent arcing between the readout brushes 51 and the segments of the readout commutators, a high speed indication circuit breaker is provided. Referring to Figs. 2 and 3, it is seen that the circuit breaker is mounted on a plate 124 which is supported on base plate 10 by means of posts 125. An arm 126 is pivotally mounted on a stud 127 and insulated from it by an insulated bushing 128. Fastened to arm 126 is a cam follower 129 and a contact point 130. A mating contact point 131 is mounted on a bracket 132 which is supported by and insulated from plate 124. A bracket 133 is also supported by and insulated from plate 124 and has fastened thereto a leaf spring 134 which urges arm 126 in a clockwise direction, as viewed in Fig. 2, to hold contact 130 against contact 131.

In Fig. 2, it is noted that cam follower 129 is in engagement with an insulated cam 135 which is fastened to intermediate shaft 64 of the register attachment. The timing of this cam is such that when the register is moving from either a low count to a high count or a high count to a low count, the contacts 130 and 131 are opened slightly before the brushes 51 lose contact with the segments in the readout commutators. Contacts 130 and 131 close again slightly before the brushes 51 are positioned on the next succeeding segment.

The linear motion follow-up means

The linear motion follow-up means follows and senses the position of an element linearly movable in accordance with a variable. Such element may be a part of a weighing scale, or a pressure gage, or other measuring instrument. For the present disclosure, the element may be considered as part of the force measuring instrument, hereinafter called a scale, disclosed in Patent No. 2,325,345 to M. C. Tate.

Referring to Fig. 1, the rod 136 is a linearly movable element which is displaceable vertically in accordance with a force applied to the scale. This rod 136 may be considered as corresponding to the rod 9 of the scale disclosed in the patent just mentioned.

Rod 136, in the present case, is set at a neutral or zero position under the influence of a load which may be referred to as the index load. Loads added to the index load are called positive loads and will produce descending movement of the rod 136. Loads diminishing the index load are called negative loads and will produce rising movement of rod 136. Rod 136 may be given a predetermined range of travel under the influence of different ranges of loads, as disclosed in the aforementioned patent. Two ranges, high and low, will be considered here, the low range being $\frac{1}{10}$ the high range.

Rod 136 carries a crosshead 137 on which is a rack 138 meshed with a pinion 139 on the shaft of a pointer 140. The pointer coacts with a suitably graduated indicating chart (not shown). The pointer and chart provide an indication, directly at the scale, of the applied load. However, the indication given by the pointer and chart must be interpolated by the operator and, hence, cannot be read with the utmost accuracy. It is desired to furnish an accurate indication of the load value in numeral form not requiring interpolation, and for the indication to be given at a location remote from the scale. These considerations underlie the use of a follow-up means for the load responsive element, such follow-up means to control the register, previously described, which will control the remote indicating means.

The follow-up means will be moved to sense the position of the rod 136. Thereby, any errors which derive from the drive connections between the rod 136 and the pointer 140 are avoided in the follow-up means. In order to avoid undesired reaction between the follow-up means and the load responsive means, the follow-up means does not sense the rod 136 itself but senses a control device movable with the rod. The control device comprises a contact rod 142 (Fig. 1) which is made of a magnesium alloy and weighs about a quarter of an ounce, a weight which is a minute fraction of that of rod 136 and operating means (not shown) for the rod 136.

The contact rod 142 is provided at its lower end with a contact 142c which is ground smooth and flat. The upper end of the rod 142 has a terminal screw 142d from which a bent thin wire 143 leads to a fixed terminal rod 144. The wire 143 is of such length, flexibility and form that it will not interfere with the movement of rod 142.

The contact rod 142 is one element of a sensing circuit which senses the positions of the load responsive means. The other element of this sensing circuit is the linear motion follow-up means which comprises a micrometer structure having a barrel 145 secured to a metal shelf 146 which is rigidly carried by brackets 11 bolted to frame 12 (Fig. 1). Secured to the barrel 145 (Fig. 1) is the nut 147 for the micrometer screw 148. The screw 148, at its lower end, is pinned to the base of the micrometer thimble 149. At its lower end, the thimble 149 rigidly carries the gear 26 which is meshed with the pinion 25 (Fig. 3). As previously explained, pinion 25 is rigid with gear 24 which is driven by pinion 23 on the shaft 20, and the shaft 20 is rotated, by worm gearing 18 and 19, from the motor shaft 16. Thus, the rotation of the gear 26, the micrometer thimble 149, and the micrometer screw 148 is proportional to the rotation of shaft 20. The vertical travel of the micrometer screw is proportional to its rotation. Also, as previously explained, shaft 20 drives the units order shaft 32 of the register. Hence, the rotation of shaft 32 and the operation of the register have a predetermined relation to the vertical travel of the micrometer screw 148.

The upper end of the micrometer screw 148 mounts a cage 150 (Fig. 1) for a ball contact 151. There is conductive engagement between the contact 151, screw 148, the micrometer barrel 145, and the shelf 146 which is grounded. When the contact 151 is separated from contact 142c, the motor M is operated, by a circuit explained in the subsequent circuit description, in a direction to cause upward travel of the micrometer screw. When the contact 151 meets the contact 142c, then the micrometer screw has reached a vertical position corresponding to the position of the contact rod 142. Since the contact 151 is a portion of a sphere and the contact 142c is smooth and flat, the contacts will meet at a single precise point. Both contacts are formed of hard metal so that their meeting point will not vary, whereby the position of the micrometer screw will always be determined by the same point of the load responsive controller comprised of contact rod 142 and contact 142c.

In a manner explained in the subsequent circuit description, the meeting of the contacts 151 and 142c establishes a sensing circuit. An ultimate result of the making of this circuit is that motor M is reversed to cause the micrometer screw to travel downwardly, whereby contacts 151 and 142c break. The ultimate result of the break of the contacts and sensing circuit is that the motor again reverses, causing the micrometer screw to move upwardly until contacts 151 and 142c again make. Such recurring reversals of the travel of the micrometer screw occur continually, so that the micrometer is constantly hunting the position of the load responsive means. It is, therefore, unnecessary to start the follow-up means from an initial position for sensing a load position and to return the follow-up means to the initial position before moving it to sense a new load position. In short, the follow-up means moves directly from its previous load sensing position to the new load sensing position and remains constantly alert to and immediately responsive to changes in the load position of the load responsive means.

The range of travel of the load responsive rod 136 determines the distance which the micrometer screw 148 should move from the neutral or zero position. If the micrometer screw should move down past a position corresponding to the maximum positive position of rod 136, then a flange 149a on the micrometer barrel 149 will open lower limit contacts DL (Fig. 1). If the screw should move up past the position corresponding to the maximum negative position of the rod 136, the flange 149a will open upper limit contacts TL. The opening of either of the contacts DL and TL opens the circuit of motor M, as will be made clear in the subsequent circuit description.

For a detailed description of the structure and function of the contact rod 142 and the micrometer device reference should be made to Figs. 2 and 3 of Patent No. 2,506,470 issued May 2, 1950, to R. I. Roth.

The circuits and operation of the gage unit

Referring to Figs. 10a and 10b closure of main line switch 160 connects 110 v. A. C. across lines 161 and 162. Power is thus supplied to the primary winding of a transformer 163 which provides a voltage supply for a rectifier tube 164 and heater current for tubes 165, 166, 167 and 168. Tube 164 is a conventional full wave rectifier which supplies direct current to lines 169 and 170. This current is filtered by means of an inductor 171 and condensers 172 and 173 and is applied across a voltage divider 174. A tap wire 175 on divider 174 is grounded and another tap wire 176 provides the proper plate voltage for tubes 165, 166 and 168. A condenser 177 is connected between wires 175 and 176 to maintain substantially constant voltage between these wires at all times. A resistor 178 is connected between wires 175 and 170. A tap wire 179 extending from resistor 178 provides the proper grid bias for tube 166 and a condenser 180 maintains substantially constant voltage between wires 175 and 179.

Tube 165 and the associated components comprise a conventional oscillator which delivers alternating current at a frequency of approximately 2,000 cycles to the primary winding of a transformer 181. One side of the secondary winding of transformer 181 is connected to one side of the primary winding of a transformer 182 and the other side of the secondary winding is connected through a wire 183, rod 144 and wire 143 to contact 142c which is located on contact rod 142 of the control device as previously explained in the mechanical description (Fig. 1). It will be noted that one side of the primary winding of transformer 182 is grounded and consequently when the grounded ball contact 151 of the micrometer structure makes contact with contact 142c, the output of oscillator tube 165 is applied to the primary winding of transformer 182. The secondary winding of transformer 182 is connected to the grid of tube 166 which is arranged in a conventional amplifier circuit and the output of which is applied to the primary winding of a transformer 184. The secondary winding of transformer 184 is connected to tube 167 which is arranged in a conventional full wave rectifier circuit and this rectified output of tube 167 is applied to the grid of tube 168. The characteristics of tube 168 are such that if its grid is made sufficiently positive with respect to its cathode, current will flow in its plate circuit and energize relay R1. Thus, when micrometer ball contact 151 makes contact with contact 142c on contact rod 142, relay R1 is energized and when micrometer ball contact 151 loses contact with contact 142c, relay R1 is deenergized.

Closure of main line switch 160 also establishes a circuit from line side 162 through motor M to line side 161. Motor M is connected to a generator 185 and energization of motor M causes the generator to deliver direct current to lines 186 and 187. Assuming that the micrometer screw 148 (Fig. 1) is within limits between contacts TL and DL, these limit contacts are closed thereby completing a circuit through relay R5. The energization of relay R5 closes relay contacts R5a to establish a circuit from line side 162, through relay contacts R5a, relay contacts R1a, armature 189 of motor M, resistor 190, relay contacts R1b, field coil 191 of motor M to line 161. This circuit occurs if the micrometer ball contact 151 is not in contact with contact 142c and relay R1 is not energized.

The energization of relay R1 causes transfer of relay contacts R1a and R1b which completes a circuit from line side 162, through relay contacts R5a, relay contacts R1b (shifted), resistor 190, armature 189 of motor M, relay contacts R1a (shifted), field coil 191 of motor M to line 161. It is thus seen that transfer of relay contacts R1a and R1b directs the circuit in the opposite direction through armature 189 of the register drive motor M, thereby causing it to run in the opposite direction. Condensers 192 and resistors 193 are provided at various locations in the circuit to suppress arcing at the relay contacts R1a and R1b.

A pair of governor contacts 194 is located on the motor M and is normally closed when the motor is operating at substantially low speeds as is the case when the motor is "hunting." During the hunting operation, the motor is being reversed at the rate of approximately two times per second and consequently it does not run long enough in one direction to attain the speed required to open governor contacts 194. At low speeds relay R4 is energized and contacts R4a are opened permitting all of the resistance in resistor 190 to be in the register drive motor circuit. If contact 142c makes a sudden change in either an upward or downward direction, motor M is required to run a number of revolutions in order to close or open the contact between 142c and ball contact 151. After motor M has turned several revolutions in one direction, it attains enough speed to open governor contacts 194, thus deenergizing relay R4 and closing relay contacts R4a. The closure of contacts R4a shunts out a portion of the resistance of resistor 190 permitting additional current to flow through the motor M which causes it to run at high speed.

As long as contact 142c remains in one position, the motor M alternately runs in different directions in order to cause ball contact 151 to make and break contact with contact 142c. Arm 38 (Figs. 3 and 8) is oscillated by the mechanical mechanism described hereinbefore and arms 88 and 89 follow this oscillation. Shaft 85, however, is not rotated far enough to cause cam 94 to close switch 95 (Fig. 2). Each time the motor M reverses switch 106 is opened by block 103 (Fig. 5) to deenergize relay R3.

If contact 142c is moved upward or downward sufficiently to cause arm 38 to effect closure of switch 95 through cam 94, a circuit is completed from line side 187 through switch 95, air valve solenoid 195 and relay R2 in parallel with the air valve solenoid, to line side 186. The energization of relay R2 closes relay contacts R2a to establish a holding circuit for the air valve solenoid, as follows: from line side 186, air valve solenoid 195, relay R2 in parallel with solenoid 195, relay contacts R2a, relay contacts R3a (now closed) to line side 187. The energization of air valve solenoid 195 permits air to be admitted to the bore of casting 75 (Fig. 3). Piston 76 is moved to the left causing detent plate 47 to be retracted from engagement with star wheel 46 on units shaft 32 and arm 38 to be returned to its central position by arms 88 and 89. The units shaft 32 is now driven continuously until the ball contact 151 makes or breaks contact with contact 142c. When this occurs, motor M reverses, switch 106 opens and relay R3 is dropped out momentarily to cause deenergization of relay R2 and the air valve solenoid 195. The micrometer screw 148 (Fig. 1) will now "hunt" about its new location and the register will be at rest in a new position.

The indicating lamp bank

Power is also supplied to the primary winding of a transformer 196 which provides current for an indicating lamp bank shown diagrammatically in Fig. 10b. The lamp bank is operated to visually show the amounts read out of the register. The lamp bank includes light bulbs and character patterns selectively illuminated by the bulbs when lit.

The lamp circuits are shown in Fig. 10b and it is seen that each lamp is wired to a conducting segment of a corresponding readout commutator. When the brush 51 of a readout commutator wipes a segment, a circuit is completed to the lamp which is wired to that segment. The circuit is broken slightly before the brush breaks contact with the segment. A steady indication is obtained when the brush comes to rest on a particular segment. It has been previously explained that contacts 130 and 131 open slightly before brushes 51 lose contact with the segments and close again slightly before the brushes are positioned on the next succeeding segment to prevent arcing of the brushes when the register is in motion.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a gage unit or the like, the combination with deflectable means positionable according to a variable, of means to sense the positions of the deflectable means, means for driving the sensing means in one direction to effect sensing coaction with the deflectable means and in the opposite direction away from sensing coaction, registering means for registering an amount dependent on the position of the sensing means, means for locking said registering means against movement by said driving means, a control relay for said locking means, a circuit operated under control of the deflecting means for operating said relay, a circuit established under control of said relay for releasing said registering means to register an amount dependent on the position of the deflecting means, a second control relay, and a circuit operated under control of said sensing means for operating said second relay to again make said locking means effective.

2. In a gage unit or the like, the combination with deflectable means positionable according to a variable, of means to sense the positions of the deflectable means, means for driving the sensing means in one direction to effect sensing coaction with the deflectable means and in the opposite direction away from sensing coaction, a plural order counting register for registering an amount dependent on the position of the sensing means, said register having a units order shaft which drives the higher orders of the register, a rotatable member mounted on the units order shaft and driven by said driving means, a differential mechanism cooperating with said rotatable member to drive said units order shaft, a shaft mounted for oscillation by said mechanism, means for locking said units order shaft against movement by said mechanism, means actuated by said oscillated shaft for rendering said locking means effective, means controlled by said deflecting means for releasing said units order shaft to permit said register to register an amount dependent on the position of the deflecting means and means controlled by said sensing means for again making said locking means effective.

3. In a gage unit or the like, the combination with deflectable means positionable according to a variable, of means to sense the positions of the deflectable means, means for driving the sensing means in one direction to effect sensing coaction with the deflectable means, and in the opposite direction away from sensing coaction, a plural order counting register for registering an amount dependent on the position of the sensing means, said register having a units order shaft which drives the higher orders of the register, a wheel secured to said units order shaft, a rotatable member mounted on the units order shaft and driven by said driving means, a train of differential gearing cooperating with said rotatable member to drive said units order shaft, means for locking said units order shaft against movement by said train comprising a piston and a slidable detent plate operable by said piston, spring means for constantly urging said detent plate into engagement with said wheel, means controlled by said deflecting means for actuating said piston, thereby releasing said detent plate from engagement with said wheel to permit said register to register an amount dependent on the position of the deflecting means and means controlled by said sensing means for again making said locking means effective.

References Cited in the file of this patent

UNITED STATES PATENTS

| Number | Name | Date |
|---|---|---|
| 1,084,632 | Heuser | Jan. 20, 1914 |
| 1,498,544 | Fowler | June 24, 1924 |
| 1,953,328 | Woolley | Apr. 3, 1934 |
| 2,164,956 | Smith | July 4, 1939 |
| 2,445,200 | Wolfe | July 13, 1948 |
| 2,496,366 | Adelson | Feb. 7, 1950 |

FOREIGN PATENTS

| Number | Country | Date |
|---|---|---|
| 383,343 | Great Britain | Nov. 17, 1932 |